(12) United States Patent
Miyata

(10) Patent No.: US 11,194,218 B2
(45) Date of Patent: Dec. 7, 2021

(54) DISPLAY DEVICE SUBSTRATE, DISPLAY DEVICE, ELECTRONIC APPARATUS, AND METHOD FOR MANUFACTURING DISPLAY DEVICE SUBSTRATE

(71) Applicant: E INK CORPORATION, Billerica, MA (US)

(72) Inventor: Takashi Miyata, Shiojiri (JP)

(73) Assignee: E Ink Corporation, Billerica, MA (US)

( * ) Notice: Subject to any disclaimer, the term of this patent is extended or adjusted under 35 U.S.C. 154(b) by 95 days.

(21) Appl. No.: 16/826,374

(22) Filed: Mar. 23, 2020

(65) Prior Publication Data

US 2020/0218125 A1    Jul. 9, 2020

Related U.S. Application Data

(63) Continuation of application No. 15/259,165, filed on Sep. 8, 2016, now Pat. No. 10,599,004.

(30) Foreign Application Priority Data

Sep. 18, 2015   (JP) ................ 2015-184810

(51) Int. Cl.
| | |
|---|---|
| *G02F 1/153* | (2006.01) |
| *G02F 1/167* | (2019.01) |
| *G09G 3/34* | (2006.01) |
| *G02F 1/1681* | (2019.01) |
| *G02F 1/16756* | (2019.01) |
| *G02F 1/16766* | (2019.01) |
| *G02F 1/1679* | (2019.01) |

(52) U.S. Cl.
CPC ............ *G02F 1/167* (2013.01); *G02F 1/1679* (2019.01); *G02F 1/1681* (2019.01); *G02F 1/16756* (2019.01); *G02F 1/16766* (2019.01); *G09G 3/344* (2013.01); *G09G 2300/0426* (2013.01); *G09G 2370/08* (2013.01)

(58) Field of Classification Search
CPC ............ G02F 1/16757; G02F 1/16766; G02F 1/1679; G02F 1/16756; G02F 1/1681; G02F 1/167; G02F 1/1339; G02F 1/1345; G02F 2001/1672; G02F 2001/1676
See application file for complete search history.

(56) References Cited

U.S. PATENT DOCUMENTS

| | | | |
|---|---|---|---|
| 6,738,039 B2 | 5/2004 | Goden | |
| 7,580,181 B2 * | 8/2009 | Ohshima ................ | G02F 1/167 359/296 |
| 8,189,296 B2 | 5/2012 | Hata et al. | |

(Continued)

FOREIGN PATENT DOCUMENTS

| | | |
|---|---|---|
| JP | 2000352728 A | 12/2000 |
| JP | 2004138960 A | 5/2004 |
| JP | 2007047495 A | 2/2007 |

*Primary Examiner* — Joseph P Martinez
(74) *Attorney, Agent, or Firm* — Ioannis Constantinides

(57) ABSTRACT

A first substrate includes: a first base material including an insulating layer; and a partition wall disposed on the insulating layer. The insulating layer and the partition wall are formed of a resin material. The partition wall has a higher hardness than the insulating layer. A protective film that protects the insulating layer is disposed on a surface of the insulating layer. A portion of the protective film is located between the partition wall and the insulating layer.

8 Claims, 10 Drawing Sheets

(56) References Cited

U.S. PATENT DOCUMENTS

| | | |
|---|---|---|
| 8,643,939 B2 | 2/2014 | Hayashi |
| 8,699,119 B2 | 4/2014 | Nakagawa et al. |
| 9,638,961 B2 | 5/2017 | Nomura |
| 2011/0090143 A1 | 4/2011 | Paek et al. |

* cited by examiner

DISPLAY DEVICE SUBSTRATE, DISPLAY DEVICE, ELECTRONIC APPARATUS, AND METHOD FOR MANUFACTURING DISPLAY DEVICE SUBSTRATE

BACKGROUND

1. Technical Field

The present invention relates to a display device substrate, a display device, an electronic apparatus, and a method for manufacturing a display device substrate.

2. Related Art

Electrophoretic display devices in which particles having charges move in a dispersion medium are widely used. The electrophoretic display device has less screen flicker, and therefore is used as a display device for viewing an electronic book, or the like. This type of electrophoretic display device is disclosed in JP-A-2007-240679. According to JP-A-2007-240679, the electrophoretic display device includes a pair of substrates disposed with electrodes. A dispersion medium containing colored charged particles is disposed between the electrodes. A partition wall is disposed in a grid shape between the substrates, and rooms are partitioned by the partition wall. A distance between the substrates is kept by the partition wall.

In the room, the colored charged particles are charged. By applying voltages to a pair of electrodes disposed in the substrates facing each other, the colored charged particles are attracted to one of the electrodes. Next, by changing the voltages of the electrodes, the position of the colored charged particles is changed.

Pixel electrodes are disposed in one of the substrates, and the pixel electrode serves as one pixel. By controlling the position of the colored charged particles for each of the pixels, a predetermined figure can be displayed.

In JP-A-2007-240679, an insulating film covered by an inorganic material is disposed on a surface of the one substrate. The partition wall is disposed on the insulating film. The material of the partition wall is a cardo polymer, which is one kind of resin materials. After the dispersion medium is disposed in the room within the partition wall, the pair of substrates are combined together. When the pair of substrate are combined together, a load is applied between the substrates. In this case, since the partition wall and the insulating film are made of the materials having different properties, the partition wall and the insulating film are not securely bonded together. Thus, when a load is applied to the partition wall, the partition wall and the insulating film may peel from each other or may be shifted to each other. In this case, the partition wall collapses or crushes, and therefore, there is a need for a display device substrate, in which the partition wall is inhibited from collapsing or crushing even when a load is applied between the substrates.

SUMMARY

An advantage of some aspects of the invention is to solve at least a part of the problems described above, and the invention can be implemented as the following forms or application examples.

Application Example 1

A display device substrate according to this application example includes: a substrate including an insulating layer; and a partition wall disposed on the insulating layer, wherein the insulating layer and the partition wall are formed of a resin material, and the partition wall has a higher hardness than the insulating layer.

According to this application example, the display device substrate includes the substrate, and the substrate is disposed with the insulating layer. The partition wall is disposed on the insulating layer. The insulating layer and the partition wall are formed of a resin material. Thus, compared with the case where one of the insulating layer and the partition wall is an inorganic material, the insulating layer and the partition wall can be fixed together at high strength. Further, the partition wall has a higher hardness than the insulating layer, and therefore has strength. As a result, even when a load is applied to the partition wall, it is possible to inhibit the partition wall from collapsing or crushing.

Application Example 2

In the display device substrate according to the application example, it is preferable that a protective film that protects the insulating layer is disposed on a surface of the insulating layer.

According to this application example, the protective film protecting the insulating layer is disposed on the surface of the insulating layer. Thus, since the insulating layer and a chemical liquid constituting a display device do not come in contact with each other, the chemical liquid or the insulating layer can be prevented from being damaged.

Application Example 3

In the display device substrate according to the application example, it is preferable that the protective film includes an opening, and that the partition wall is disposed so as to close the opening.

According to this application example, the partition wall is disposed so as to close the opening of the protective film, so that a chemical liquid constituting a display device is inhibited from coming in contact with the insulating layer by the protective film, and also that the partition wall made of resin and the insulating layer made of resin can be fixed together while being in contact with each other.

Application Example 4

In the display device substrate according to the application example, it is preferable that the substrate includes one pixel electrode corresponding to one pixel, and that the partition wall is disposed to surround the pixel electrode.

According to this application example, the substrate is disposed with one pixel electrode corresponding to one pixel. The partition wall is disposed to surround the pixel electrode. In this case, compared with the case where the partition wall surrounds a plurality of pixel electrodes, the area surrounded by the partition wall is reduced. Thus, since the area within the partition wall is small, the strength of the partition wall can be increased. As a result, even when a load is applied to the partition wall, it is possible to inhibit the partition wall from collapsing or crushing.

Application Example 5

In the display device substrate according to the application example, it is preferable that a circuit portion that is electrically connected to the pixel electrode is disposed between the substrate and the insulating layer.

According to this application example, the circuit portion electrically connected to the pixel electrode is provided between the substrate and the insulating layer. Thus, it is possible to inhibit the circuit portion from being eroded by a chemical liquid or the like constituting a display device.

Application Example 6

In the display device substrate according to the application example, it is preferable that the insulating layer is a planarizing layer.

According to this application example, since the insulating layer is a planarizing layer, the pixel electrode can be formed into a flat shape, and thus display quality can be improved.

Application Example 7

A display device according to this application example includes: the display device substrate described above; a transparent sealing member supported by the partition wall; a counter electrode disposed on the transparent sealing member; a circuit portion located between the substrate and the insulating layer and connected to a pixel electrode; and an electrophoretic dispersion liquid sealed in a space formed by the partition wall, the transparent sealing member, and the substrate.

According to this application example, the display device includes the display device substrate, and the transparent sealing member is supported by the partition wall. The counter electrode is disposed on the transparent sealing member. The display device substrate is disposed with the partition wall, and the electrophoretic dispersion liquid is disposed in a pixel region surrounded by the partition wall. Thus, the partition wall is located between the display device substrate and the counter electrode. Since the partition wall is less likely to collapse or crush even when a load is applied, the display device substrate, and the transparent sealing member and the counter electrode can be easily assembled.

Application Example 8

An electronic apparatus according to this application example includes: the display device described above; and a control unit that controls the display device.

According to this application example, the control unit controls the display device in the electronic apparatus. Since the display device is less likely to collapse or crush even when a load is applied to the partition wall, the display device is a device in which the display device substrate and the transparent sealing member can be easily assembled. Thus, the electronic apparatus can be a device including the display device in which the display device substrate and the transparent sealing member can be easily assembled.

Application Example 9

A method for manufacturing a display device substrate according to this application example includes: disposing an insulating layer of a resin material on a substrate; disposing a protective film on the insulating layer; removing a portion of the protective film; and disposing a partition wall of a resin material to cover the insulating layer at a place where the portion of the protective film is removed.

According to this application example, the insulating layer of a resin material is disposed on the substrate. Then, the protective film is disposed on the insulating layer, and a portion of the protective film is removed. Thus, a portion of the insulating layer is exposed. The partition wall of a resin material is disposed to cover the exposed insulating layer. Thus, since the insulating layer of a resin material and the partition wall of a resin material are connected to each other, the insulating layer and the partition wall can be securely connected. As a result, even when a load is applied to the partition wall in a later step, it is possible to inhibit the partition wall from collapsing or crushing.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
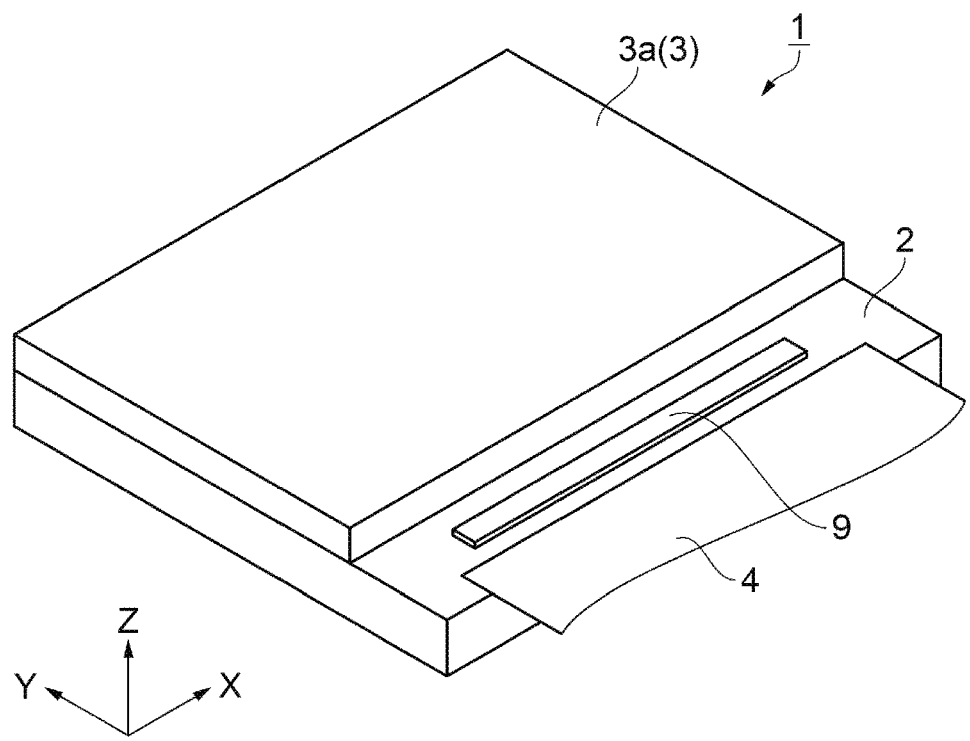
FIG. 1 is a schematic perspective view showing the structure of an electrophoretic display device according to a first embodiment.

In embodiments, an electrophoretic display device and a distinct example of manufacturing the electrophoretic display device will be described according to the drawings. Members in the drawings are illustrated on different scales for each of the members in order to show the members in recognizable sizes on the drawings.

First Embodiment

Figure 2:
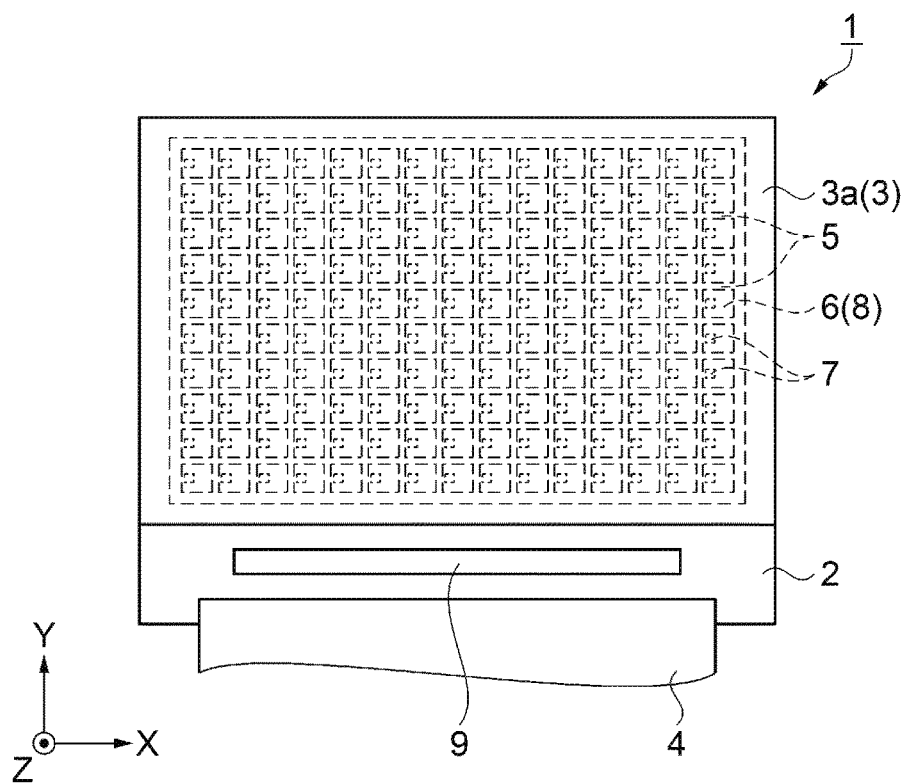
FIG. 2 is a schematic plan view showing the structure of the electrophoretic display device.

An electrophoretic display device according to a first embodiment will be described according to FIGS. 1 to 18. FIG. 1 is a schematic perspective view showing the structure of the electrophoretic display device. FIG. 2 is a schematic plan view showing the structure of the electrophoretic display device.

As shown in FIG. 1, the electrophoretic display device 1 as a display device has a structure in which a first substrate 2 as a display device substrate and a second substrate 3 are stacked on top one another. The thickness direction of the first substrate 2 and the second substrate 3 is defined as a Z direction, and directions along the side surfaces of the first substrate 2 are defined as an X direction and a Y direction. The second substrate 3 is located on the +Z direction side. When viewing the electrophoretic display device 1, a viewer views the electrophoretic display device 1 from the +Z direction side. A surface of the second substrate 3 on the +Z direction side is an image display surface 3a. The first substrate 2 has a shape longer in the −Y direction than the second substrate 3. On the −Y direction side of the first substrate 2, a flexible cable 4 is disposed on a surface of the first substrate 2 on the +Z direction side. The flexible cable 4 is connected to a drive circuit (not shown), from which a power source and a drive signal are supplied through the flexible cable 4.

As shown in FIG. 2, a partition wall 5 is disposed between the first substrate 2 and the second substrate 3 in the electrophoretic display device 1. The partition wall 5 has a grid shape and defines pixel regions 6. The dimensions of the partition wall 5 are not particularly limited; however, for example, the width thereof is 3 to 5 μm, and the height thereof is 30 μm in the embodiment.

In the drawing, 15 pixel regions 6 in the X direction and 10 pixel regions 6 in the Y direction are arranged side by side for clarity of illustration. The number of the pixel regions 6 is not particularly limited; however, for example, 320 pixel regions in the X direction and 250 pixel regions in the Y direction are arranged side by side in the embodiment. The size of the pixel region 6 is not particularly limited; however, for example, the length thereof in the X direction is 50 to 100 μm, and the length thereof in the Y direction is to 100 μm, in the embodiment. Also the size of the electrophoretic display device 1 is not particularly limited; however, for example, the length of the first substrate 2 in the X direction is 30 to 50 mm, and the length thereof in the Y direction is 20 to 40 mm, in the embodiment.

In the first substrate 2, a first semiconductor element 7 as a circuit portion is disposed in each of the pixel regions 6. The first semiconductor element 7 is an element that performs switching, and changes a voltage to be applied to the pixel region 6. Since the first semiconductor element 7 exists in each of the pixel regions 6, the number of the first semiconductor elements 7 is the same as the number of the pixel regions 6. When a predetermined pattern is displayed on the image display surface 3a, one pixel region 6 serves as one pixel 8. On a surface of the first substrate 2 on the +Z direction side, a signal distributing unit 9 is disposed between the second substrate 3 and the flexible cable 4. The signal distributing unit 9 changes a signal to be output to the first semiconductor element 7.

Figure 3:
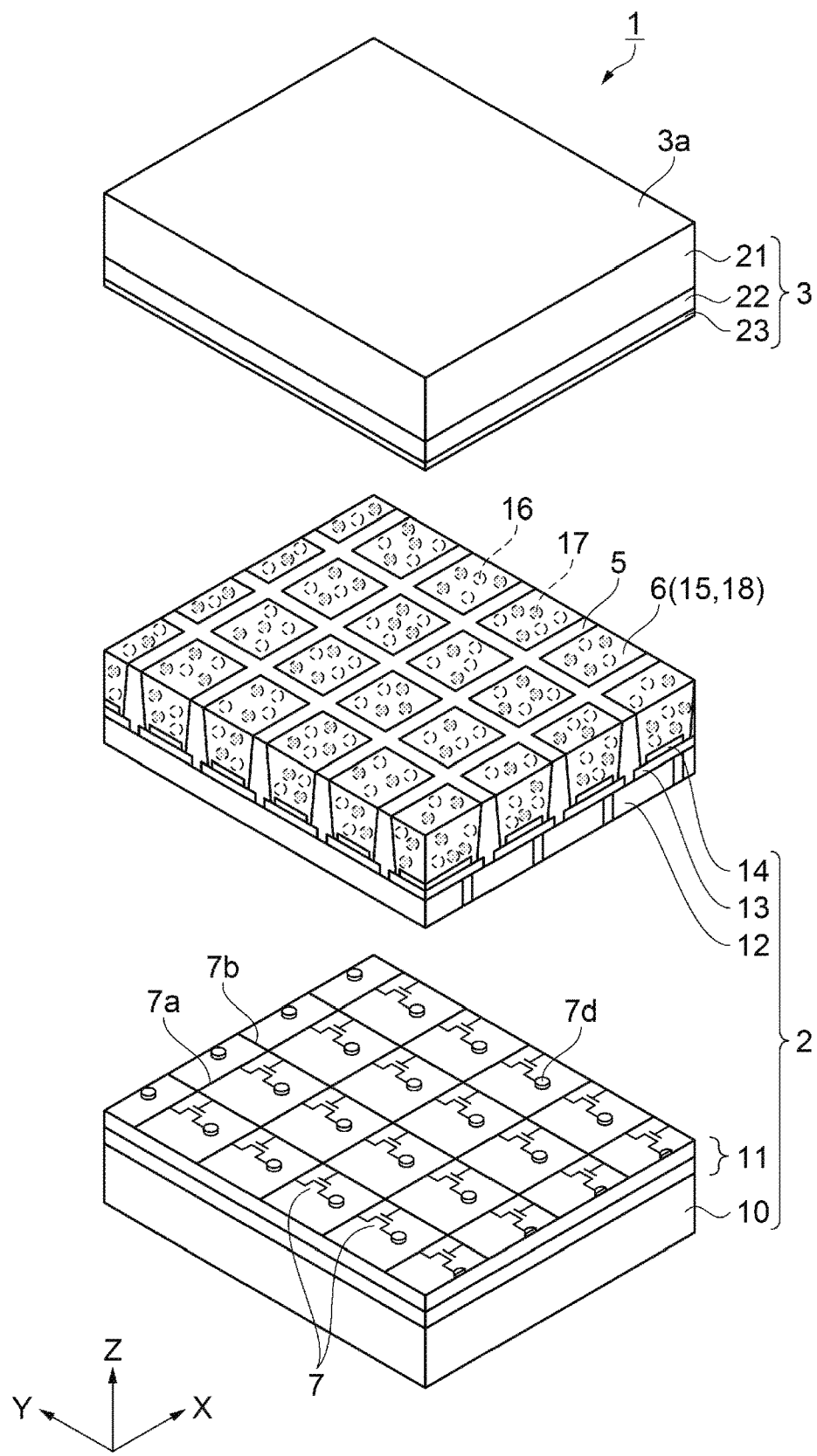
FIG. 3 is a partial schematic exploded perspective view showing the structure of the electrophoretic display device.

FIG. 3 is a partial schematic exploded perspective view showing the structure of the electrophoretic display device, in which some portions of the electrophoretic display device 1 are separated in the Z direction. As shown in FIG. 3, the first substrate 2 includes a first base material 10. Examples of materials used for the first base material 10 can include glass, plastic, ceramic, and silicon. The first base material 10 is arranged on the side opposite to the image display surface 3a, which can be seen from the +Z direction, and therefore, the material of the first base material 10 may be opaque.

An element layer 11 is disposed on the first base material 10. In the element layer 11, voltage supply lines 7a, control signal lines 7b, the first semiconductor elements 7, first through-electrode 7d, and the like are disposed. The first semiconductor element 7 is a thin film transistor (TFT) element, and is an element that performs switching. An insulating layer 12 is disposed on the element layer 11, and a protective film 13 and pixel electrodes 14 are stacked in this order on the insulating layer 12. The insulating layer 12 is a layer that insulates the element layer 11 from the pixel electrodes 14. The protective film 13 is a layer that protects the insulating layer 12. The first through-electrode 7d in the element layer 11 is connected with the pixel electrode 14. The pixel electrode 14 is separated in each of the pixel regions 6. The first substrate 2 is configured of the partition wall 5, the first base material 10, the element layer 11, the insulating layer 12, the protective film 13, the pixel electrodes 14, and the like.

The material of the element layer 11 is not particularly limited as long as the material can form semiconductor, and examples thereof can include silicon, germanium, gallium arsenide, gallium arsenide phosphide, gallium nitride, and silicon carbide. The material of the insulating layer 12 is not particularly limited as long as the material has an insulating property and is readily formable, and a resin material can be used. In the embodiment, for example, a positive photosensitive acrylic resin is used as the material of the insulating layer 12. By using a positive type, an opening to expose a portion of the insulating layer 12 can be easily formed. Moreover, the insulating layer 12 has the function of a planarizing layer so as not to reflect irregularities of the element layer 11 on the pixel region 6.

The material of the pixel electrode 14 is not particularly limited as long as the material has conductivity, and examples thereof can include, in addition to copper, aluminum, nickel, gold, silver, and indium-tin oxide (ITO), a material obtained by stacking a nickel film or gold film on copper foil, and a material obtained by stacking a nickel film or gold film on aluminum foil. In the embodiment, for example, the material of the pixel electrode 14 is ITO.

The partition wall 5 is disposed on the protective film 13 and the insulating layer 12, and an electrophoretic dispersion liquid 15 is filled in the pixel regions 6 defined by the partition wall 5. The material of the partition wall 5 is not particularly limited as long as the material has proper strength, is readily formable, and is not eluted into the electrophoretic dispersion liquid 15. A material obtained by adding a cross-linking agent to a resin material such as polyester resin, polyolefin resin, acrylic resin, or epoxy resin can be used. In the embodiment, for example, a negative photosensitive epoxy resin is used as the material of the partition wall 5. By using a negative type, a convex shape can be easily formed. The partition wall 5 is disposed so as to close an opening of the protective film 13. As can be seen from FIG. 3, the width of the opening of the protective film 13 is narrower than the width of the bottom portion of the partition wall 5. With this configuration, a portion where the partition wall 5 and the insulating layer 12 are joined together without the protective film 13 can be formed, and the partition wall 5 and the insulating layer 12 can be securely joined. Moreover, the partition wall 5 and the insulating layer 12 are joined together through the protective film 13 on both sides of the opening, so that the insulating layer 12 can be prevented from being damaged by the electrophoretic dispersion liquid 15 through the opening.

The material of the protective film 13 is not particularly limited as long as the material has an insulating property and is not eluted into the electrophoretic dispersion liquid 15. In the embodiment, for example, silicon nitride is used as the material of the protective film 13. The protective film 13 prevents the insulating layer 12 from being eluted into the electrophoretic dispersion liquid 15. With this configuration, the alteration of the electrophoretic dispersion liquid 15 is prevented, and the degradation of the insulating layer 12 is prevented.

The electrophoretic dispersion liquid 15 includes white charged particles 16 as charged particles and black charged particles 17 as charged particles. The white charged particles 16 and the black charged particles 17 are dispersed in a dispersion medium 18. The material of the white charged particles 16 is not particularly limited as long as the material is white and chargeable and can be formed into fine particles. Examples of materials used for the white charged particles 16 can include, for example, particles, high polymer, or colloid made of a white pigment such as titanium dioxide, hydrozincite, or antimony trioxide. In the embodiment, for example, positively charged titanium dioxide particles are used as the white charged particles 16.

The material of the black charged particles 17 is not particularly limited as long as the material is black and chargeable and can be formed into fine particles. Examples of materials used for the black charged particles 17 can include, for example, particles, high polymer, or colloid made of a black pigment such as aniline black, carbon black, or titanium oxynitride. In the embodiment, for example, negatively charged titanium oxynitride is used as the black charged particles 17. For the white charged particles 16 and the black charged particles 17, a charge control agent such as an electrolyte, a surfactant, metal soap, resin, rubber, oil, varnish, or a compound can be added to the particles as necessary. In addition, a dispersant such as a titanium coupling agent, an aluminum coupling agent, or a silane coupling agent, a lubricant, a stabilizer, or the like can be added to the white charged particles 16 and the black charged particles 17.

The material of the dispersion medium 18 is not particularly limited as long as the material has fluidity and is less alterable. Examples of materials used for the dispersion medium 18 can include water; alcohol solvents such as methanol, ethanol, isopropanol, butanol, octanol, and methyl cellosolve; esters such as ethyl acetate and butyl acetate; ketones such as acetone, methyl ethyl ketone, and methyl isobutyl ketone; aliphatic hydrocarbons such as pentane, hexane, and octane; and alicyclic hydrocarbons such as cyclohexane and methyl cyclohexane. In addition, examples of materials used for the dispersion medium 18 can include aromatic hydrocarbons such as benzene, toluene, xylene, and long-chain alkyl group-containing benzenes. As the long-chain alkyl group-containing benzenes, hexylbenzene, heptylbenzene, octylbenzene, nonylbenzene, decylbenzene, undecylbenzene, dodecylbenzene, tridecylbenzene, tetradecylbenzene, or the like can be used. In addition, as the dispersion medium 18, halogenated hydrocarbons such as methylene chloride, chloroform, carbon tetrachloride, and 1,2-dichloroethane can be used. In addition, examples of materials used for the dispersion medium 18 can include oils and a silicone oil. These substances can be used alone or as a mixture, and further, a surfactant such as a carboxylate, or the like may be mixed.

The second substrate 3 is disposed on the partition wall 5 and the electrophoretic dispersion liquid 15. The second substrate 3 includes a second base material 21. A common electrode 22 as a counter electrode is disposed on the second base material 21. A sealing layer 23 as a transparent sealing member that seals the electrophoretic dispersion liquid 15 is disposed on the common electrode 22. The common electrode 22 is a common electrode that is disposed over the plurality of pixel regions 6. Thus, the common electrode 22 faces the plurality of pixel electrodes 14. The second substrate 3 is joined, on the sealing layer 23 side, with the partition wall 5. Further, the sealing layer 23 has the function of insulating the partition wall 5 from the common electrode 22.

The material of the second base material 21 is not particularly limited as long as the material has a light transmitting property, strength, and an insulating property. Examples of materials used for the second base material 21 can include glass and a resin material. In the embodiment, for example, a glass plate is used as the material of the second base material 21.

The common electrode 22 is not particularly limited as long as the common electrode is a transparent conductive film. For example, MgAg, indium-gallium oxide (IGO), indium-tin oxide (ITO), indium-cerium oxide (ICO), indium-zinc oxide (IZO), or the like can be used as the common electrode 22. In the embodiment, for example, ITO is used as the common electrode 22.

The material of the sealing layer 23 is not particularly limited as long as the material can be joined with the partition wall 5, has a light transmitting property and an insulating property, and does not cause the alteration of the electrophoretic dispersion liquid 15. For example, examples of materials used for the sealing layer 23 can include polyurethane, polyurea, polyurea-polyurethane, urea-formaldehyde resin, melamine-formaldehyde resin, polyamide, polyester, polysulfonamide, polycarbonate, polysulfinate, epoxy resin, acrylic resin such as polyacrylic acid ester, polymethacrylic acid ester, polyvinyl acetate, gelatin, phenol resin, and vinyl resin. In the embodiment, for example, an ultraviolet-curable acrylic resin or epoxy resin is used.

Figure 4:
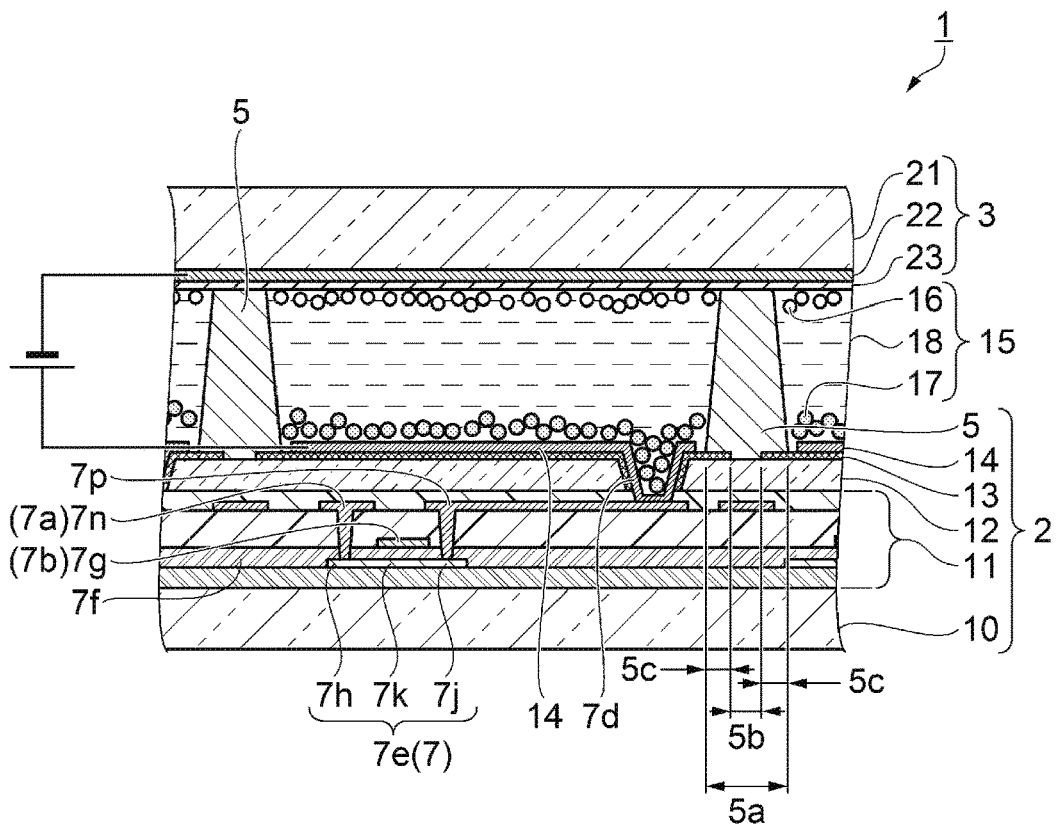
FIG. 4 is a schematic sectional side elevation showing the structure of the electrophoretic display device.

FIG. 4 is a schematic sectional side elevation showing the structure of the electrophoretic display device. As shown in FIG. 4, the electrophoretic display device 1 is used by applying a voltage between the pixel electrode 14 and the common electrode 22. Then, the voltage is changed in use between the pixel electrode 14 and the common electrode 22.

The common electrode 22 is set at a low voltage relative to the pixel electrode 14. In this case, since the black charged particles 17 are charged to a negative voltage, the black charged particles 17 are attracted to the pixel electrode 14. Since the white charged particles 16 are charged to a positive voltage, the white charged particles 16 are attracted to the common electrode 22. As a result, the black charged particles 17 gather at the first substrate 2, while the white charged particles 16 gather at the second substrate 3. When the electrophoretic display device 1 is viewed from the second substrate 3 side, the white charged particles 16 can be seen through the second substrate 3. Thus, white display is achieved in the pixel region 6.

The first semiconductor element 7 is disposed in the element layer 11. The first semiconductor element 7 includes a semiconductor film 7e. In the semiconductor film 7e, a source region 7h, a channel forming region 7k, and a drain region 7j are formed side by side in this order. A gate insulating film 7f is disposed on the semiconductor film 7e, and a gate electrode 7g is disposed on the gate insulating film 7f. A source electrode 7n is connected to the source region 7h, and the voltage supply line 7a is connected to the source electrode 7n. A first drain electrode 7p is disposed to be connected with the drain region 7j, and the first through-electrode 7d is disposed to be connected with the first drain electrode 7p. Since the first through-electrode 7d is connected with the pixel electrode 14, the first semiconductor element 7 is electrically connected with the pixel electrode 14. The control signal line 7b is connected to the gate electrode 7g.

The main material of the partition wall 5 is epoxy resin, and the main material of the insulating layer 12 is acrylic resin. The insulating layer 12 and a portion of the partition wall 5 are joined together. Thus, the joining of the insulating layer 12 and the partition wall 5 is the joining of the resin materials that are the same as each other, which makes it possible to fix the insulating layer 12 and the partition wall 5 together at high strength compared with the case where one of the insulating layer 12 and the partition wall 5 is an inorganic material. The hardness of the partition wall 5 is 2 GPa, and the hardness of the insulating layer 12 is 0.5 GPa. The partition wall 5 has a higher hardness than the insulating layer 12, and therefore has strength. For this reason, even when a load is applied to the partition wall 5 in a step of assembling the first substrate 2 and the second substrate 3 together, the deformation or the like of the partition wall 5 is prevented, and the partition wall 5 is less likely to peel from the insulating layer 12 because the partition wall 5 bites into the insulating layer 12 side. As a result, it is possible to inhibit the partition wall 5 from collapsing or crushing.

The hardness of the insulating layer 12 before curing is approximately 15 mPa/s, and the hardness of the partition wall 5 before curing is approximately 2000 mPa/s. Because of this, the material of the insulating layer 12 can be easily formed into a thin film compared with the material of the partition wall 5. However, since the insulating layer 12 is likely to be eluted into the electrophoretic dispersion liquid 15 compared with the partition wall 5, the protective film 13 is disposed to cover the insulating layer 12. Since the insulating layer 12 and the electrophoretic dispersion liquid 15 are not in contact with each other due to the protective film 13, the electrophoretic dispersion liquid 15 or the insulating layer 12 can be prevented from being damaged.

A portion of the protective film 13 is located between the partition wall 5 and the insulating layer 12. Specifically, the width of the partition wall 5 on the insulating layer 12 side is defined as a first width 5a. The partition wall 5 is joined to the insulating layer 12 at the center of the partition wall 5 in the width direction of the partition wall 5. The width of a portion of the partition wall 5 joined to the insulating layer 12 is defined as a second width 5b. For example, the length of the second width 5b is ⅓ that of the first width 5a. The protective film 13 enters between the partition wall 5 and the insulating layer 12 from the both side surfaces of the partition wall 5. The length of a portion of the protective film 13 entering between the partition wall 5 and the insulating layer 12 from the side surface of the partition wall 5 is defined as a third width 5c. For example, the length of the third width 5c is ⅓ that of the first width 5a. In this case, the protective film 13 is located on the insulating layer 12, and a portion of the partition wall 5 is located on the protective film 13. Thus, since the insulating layer 12 is covered by the partition wall 5 and the protective film 13, the insulating layer 12 is not exposed in a surface to be in contact with the electrophoretic dispersion liquid 15. As a result, it is possible to inhibit the insulating layer 12 from coming in contact with the electrophoretic dispersion liquid 15.

Figure 5:
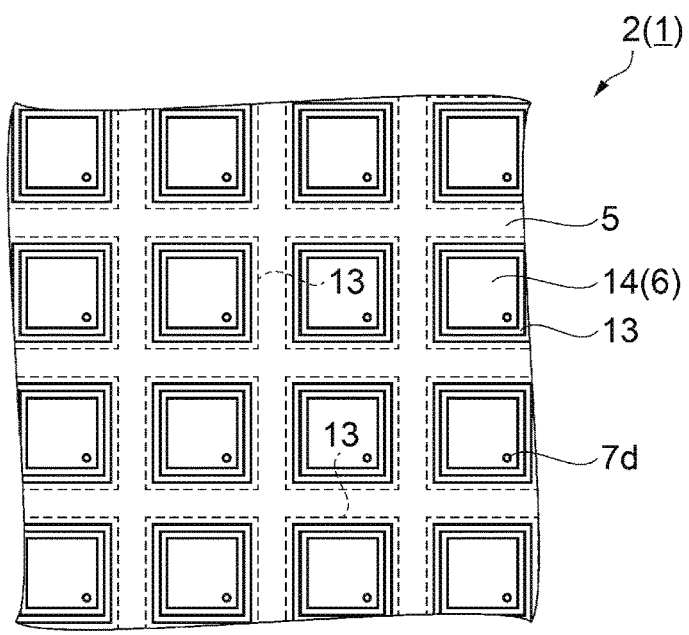
FIG. 5 is a schematic plan view of a main portion for explaining the relationship between a pixel and a partition wall.

FIG. 5 is a schematic plan view of a main portion for explaining the relationship between the pixel and the partition wall, as the first substrate 2 is viewed from the image display surface 3a side. As shown in FIG. 5, the first substrate 2 includes one pixel electrode 14 corresponding to one pixel 8. The partition wall 5 is disposed to surround the pixel electrode 14 for one pixel 8. The partition wall 5 may not surround the entire periphery of the pixel electrode 14 and may be partially removed. Then, through the removed place, the electrophoretic dispersion liquid 15 may move between the pixels 8. The partition wall 5 is disposed to surround the pixel electrode 14. In this case, compared with the case where the partition wall 5 surrounds a plurality of pixel electrodes 14, the area surrounded by the partition wall 5 can be narrowed. Then, the strength of the partition wall 5 can be increased. Thus, even when a load is applied to the partition wall 5, it is possible to inhibit the partition wall 5 from collapsing or crushing.

Figure 6:
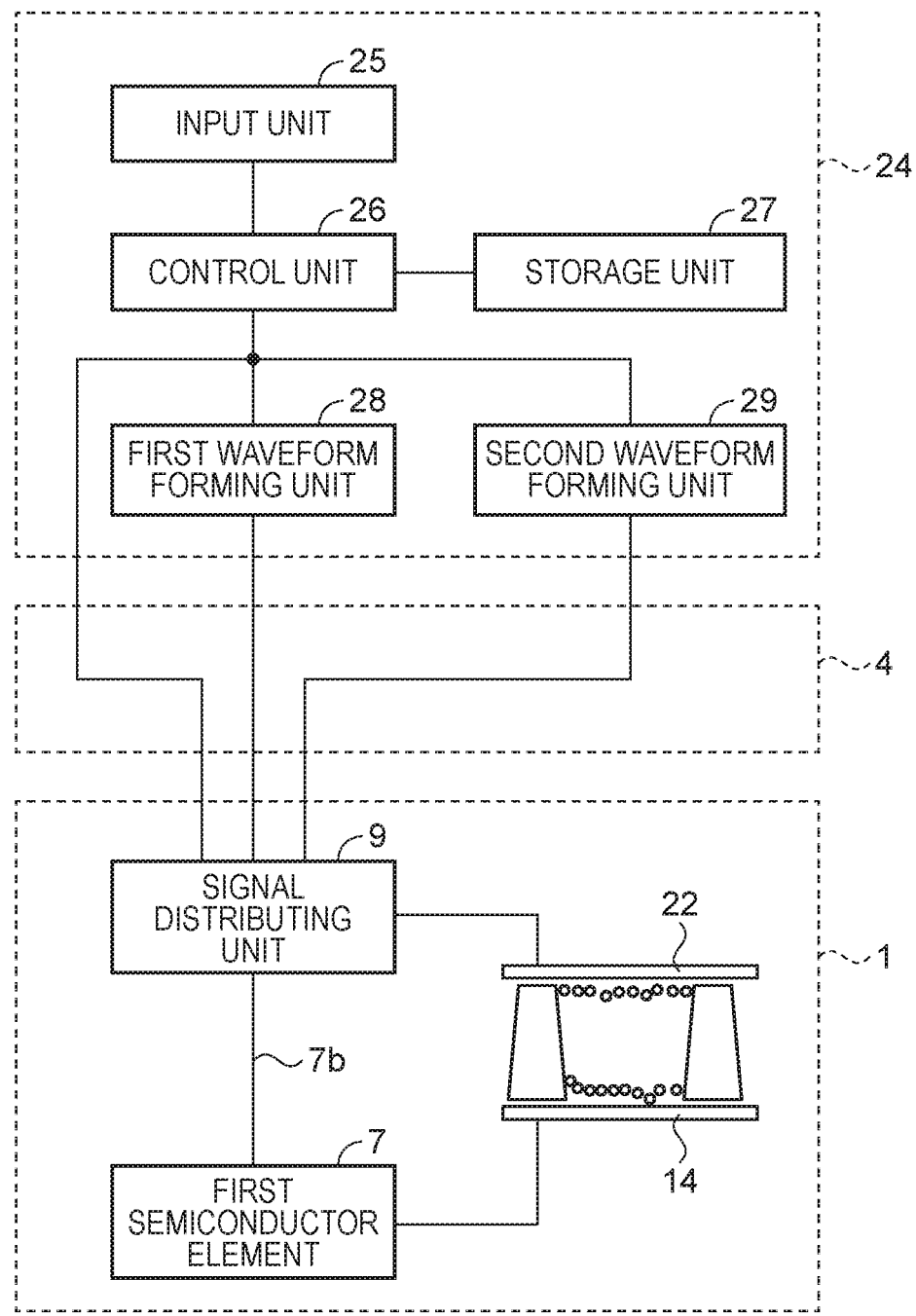
FIG. 6 is an electrical control block diagram of the electrophoretic display device.

FIG. 6 is an electrical control block diagram of the electrophoretic display device. As shown in FIG. 6, the electrophoretic display device 1 is connected in use to a controller 24. The controller 24 includes an input unit 25. The input unit 25 is connected to a device that outputs an image signal representing an image to be displayed on the electrophoretic display device 1, and receives the image signal. The input unit 25 is connected with a control unit 26. The control unit 26 is connected with a storage unit 27, a first waveform forming unit 28, a second waveform forming unit 29, and the signal distributing unit 9.

The control unit 26 is a portion that controls the first waveform forming unit 28, the second waveform forming unit 29, and the signal distributing unit 9. The storage unit 27 stores, in addition to the image signal, information used when forming, from the image signal, a signal to be output to the electrophoretic display device 1. The first waveform forming unit 28 is connected with the first semiconductor element 7 through the flexible cable 4, the signal distributing unit 9, and the control signal line 7b, and outputs a data signal for each pixel to the first semiconductor element 7. The first semiconductor element 7 is connected with the pixel electrode 14, and outputs a voltage corresponding to the data signal to the pixel electrode 14. The second waveform forming unit 29 is connected with the common electrode 22 through the flexible cable 4 and the signal distributing unit 9, and outputs a voltage waveform to the common electrode 22.

The signal distributing unit 9 distributes a drive signal to the first semiconductor element 7 to change a voltage waveform to be output to the pixel electrode 14. Further, the signal distributing unit 9 transmits a voltage waveform to be output to the common electrode 22.

Figure 7:
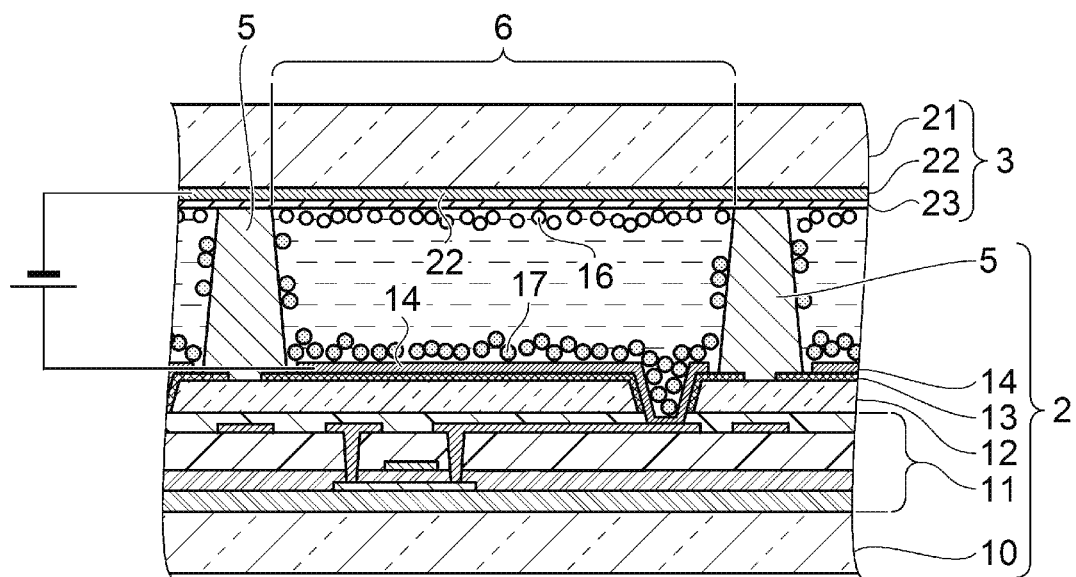
FIG. 7 is a schematic sectional side elevation showing the structure of the electrophoretic display device.
Figure 8:
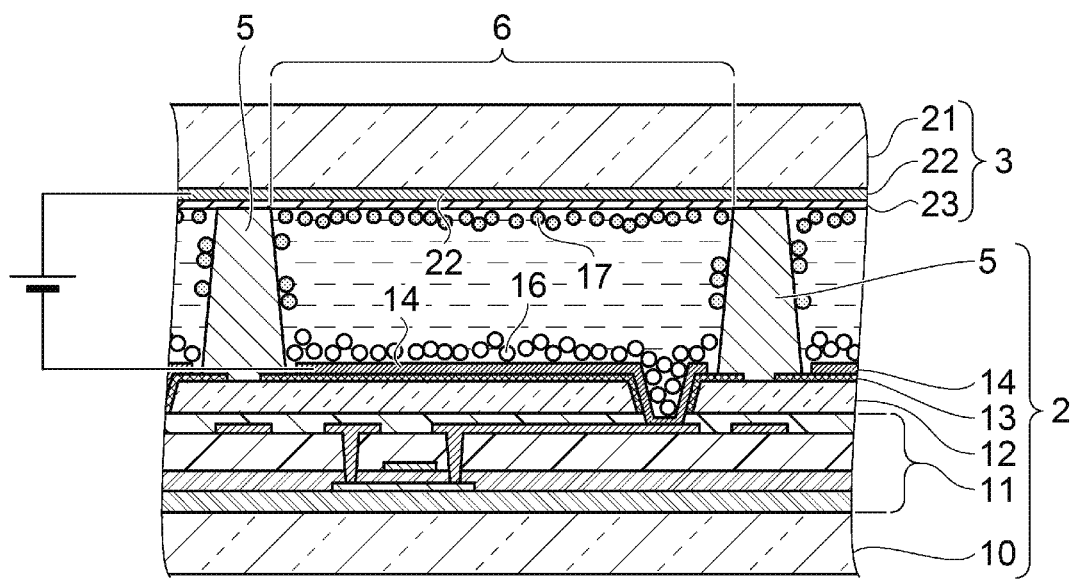
FIG. 8 is a schematic sectional side elevation showing the structure of the electrophoretic display device.

FIGS. 7 and 8 are schematic sectional side elevations showing the structure of the electrophoretic display device. As shown in FIG. 7, the common electrode 22 is set at a low voltage relative to the pixel electrode 14. In this case, since the black charged particles 17 are charged to a negative voltage, the black charged particles 17 are attracted to the pixel electrode 14. Since the white charged particles 16 are charged to a positive voltage, the white charged particles 16 are attracted to the common electrode 22. As a result, the black charged particles 17 gather at the first substrate 2, while the white charged particles 16 gather at the second substrate 3. When the electrophoretic display device 1 is viewed from the second substrate 3 side, the white charged particles 16 can be seen through the second substrate 3. Thus, white display is achieved in the pixel region 6.

As shown in FIG. 8, the common electrode 22 is set at a high voltage relative to the pixel electrode 14. In this case, since the black charged particles 17 are charged to a negative voltage, the black charged particles 17 are attracted to the common electrode 22. Since the white charged particles are charged to a positive voltage, the white charged particles 16 are attracted to the pixel electrode 14. As a result, the white charged particles 16 gather at the first substrate 2, while the black charged particles 17 gather at the second substrate 3. When the electrophoretic display device 1 is viewed from the second substrate 3 side, the black charged particles 17 can be seen through the second substrate 3. Thus, black display is achieved in the pixel region 6.

Figure 9:
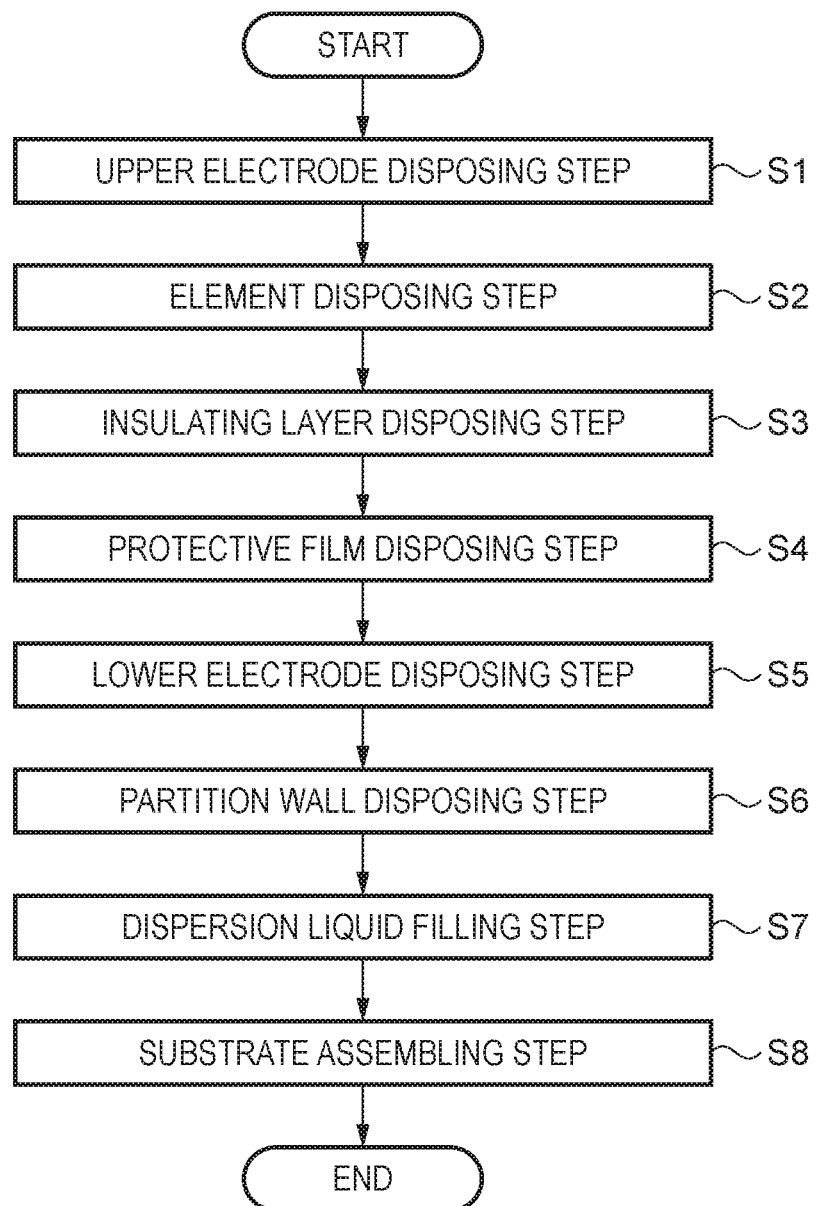
FIG. 9 is a flowchart of a method for manufacturing the electrophoretic display device.

Next, a method for manufacturing the electrophoretic display device 1 described above will be described with reference to FIGS. 9 to 18. FIG. 9 is a flowchart of the method for manufacturing the electrophoretic display device. FIGS. 10 to 18 are schematic views for explaining the method for manufacturing the electrophoretic display device. In the flowchart of FIG. 9, Step S1 corresponds to an upper electrode disposing step. This step is a step of disposing the common electrode 22 and the sealing layer 23 on the second base material 21.

Next, the method proceeds to Step S2. Step S2 is an element disposing step. This step is a step of disposing the element layer 11 on the first base material 10.

Next, the method proceeds to Step S3. Step S3 is an insulating layer disposing step. This step is a step of disposing the insulating layer 12 on the element layer 11.

Next, the method proceeds to Step S4. Step S4 is a protective film disposing step. This step is a step of disposing the protective film 13 on the insulating layer 12.

Next, the method proceeds to Step S5. Step S5 is a lower electrode disposing step. This step is a step of disposing the first through-electrode 7d and the pixel electrode 14 on the protective film 13.

Next, the method proceeds to Step S6. Step S6 is a partition wall disposing step. This step is a step of disposing the partition wall 5 on the first substrate 2.

Next, the method proceeds to Step S7. Step S7 is a dispersion liquid filling step. This step is a step of filling the pixel region 6 with the electrophoretic dispersion liquid 15.

Next, the method proceeds to Step S8. Step S8 is a substrate assembling step. This step is a step of bonding the partition wall 5 and the second substrate 3 together.

Through the steps described above, the steps of manufacturing the electrophoretic display device 1 are finished.

Next, the manufacturing method will be described in detail using FIGS. 10 to 18 in correspondence with the steps shown in FIG. 9.

Figure 10:
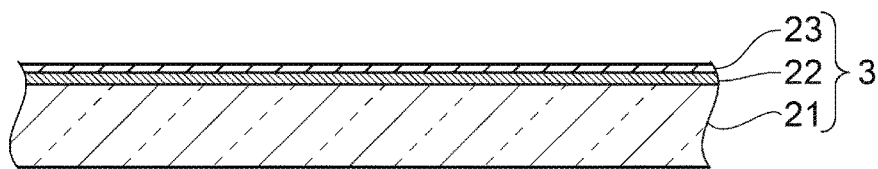
FIG. 10 is a schematic view for explaining the method for manufacturing the electrophoretic display device.

First, the second substrate 3 is manufactured. FIG. 10 is a diagram corresponding to the upper electrode disposing step of Step S1. As shown in FIG. 10, the second base material is prepared. As the second base material 21, a plate obtained by grinding a glass plate to a predetermined thickness and polishing the plate to reduce a surface roughness is used. Next, the common electrode 22 is disposed on the second base material 21. An ITO film with a film thickness of approximately 100 nm is formed on the second base material 21 using a deposition method such as a sputtering method. Next, the ITO film is patterned by a photolithography method and an etching method to form the common electrode 22.

Next, the sealing layer 23 is disposed on the common electrode 22. The sealing layer 23 can be disposed using an ink jet method and various kinds of printing methods such as offset printing, screen printing, relief printing including flexographic printing, and intaglio printing including gravure printing. In addition, a spin coating method, a roll coating method, a die coating method, a slit coating method, a curtain coating method, a spray coating method, a dip coating method, or the like may be used.

Figure 11:
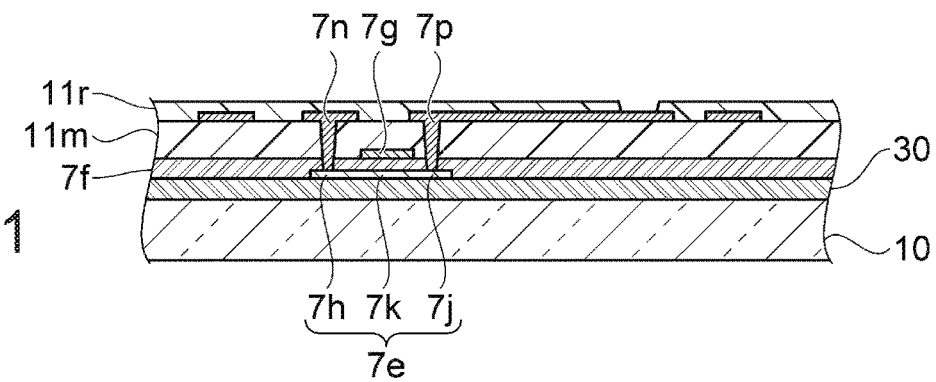
FIG. 11 is a schematic view for explaining the method for manufacturing the electrophoretic display device.

Subsequently, the first substrate 2 is manufactured. FIG. 11 is a diagram corresponding to the element disposing step of Step S2. As shown in FIG. 11, in Step S2, the first base material 10 is prepared. Also as the first base material 10, a plate obtained by grinding a glass plate to a predetermined thickness and polishing the plate to reduce a surface roughness is used. The element layer 11 is formed on the first base material 10. Since the method for forming the element layer 11 is publicly known, a detailed description is omitted, and the manufacturing method will be roughly described. There are multiple methods for forming the element layer 11, and the forming method is not particularly limited.

First, a foundation insulating film 30 of $SiO_2$ is formed on the first base material 10 by a chemical vapor deposition (CVD) method. Next, an amorphous silicon film with a film thickness of approximately 50 nm is formed on the foundation insulating film by a CVD method or the like. The amorphous silicon film is crystallized by a laser crystallization method or the like to form a polycrystalline silicon film. Thereafter, the semiconductor film 7e as an island-like polycrystalline silicon film is formed by a photolithography method and an etching method or the like.

Next, $SiO_2$ with a film thickness of approximately 100 nm is formed so as to cover the semiconductor film 7e and the foundation insulating film by a CVD method or the like to serve as the gate insulating film 7f. A Mo film with a film thickness of approximately 500 nm is formed on the gate insulating film 7f by a sputtering method or the like, and the gate electrode 7g having an island-like shape is formed by a photolithography method and an etching method. Impurity ions are implanted into the semiconductor film by an ion implantation method to form the source region 7h, the drain region 7j, and the channel forming region 7k. A $SiO_2$ film with a film thickness of approximately 800 nm is formed so as to cover the gate insulating film 7f and the gate electrode 7g to serve as a first inter-layer insulating film 11m.

Next, a contact hole reaching the source region 7h and a contact hole reaching the drain region 7j are formed in the first inter-layer insulating film 11m. Thereafter, a Mo film with a film thickness of approximately 500 nm is formed on the first inter-layer insulating film 11m and in the contact holes by a sputtering method or the like, and patterned by a photolithography method and an etching method, to form the source electrode 7n, the first drain electrode 7p, and wires (not shown).

A $Si_3N_4$ film with a film thickness of approximately 800 nm is formed so as to cover the first inter-layer insulating film 11m, the source electrode 7n, the first drain electrode 7p, and the wires to serve as a second inter-layer insulating film 11r. The second inter-layer insulating film 11r is patterned by a photolithography method and an etching method to form a contact hole therein.

Figure 12:
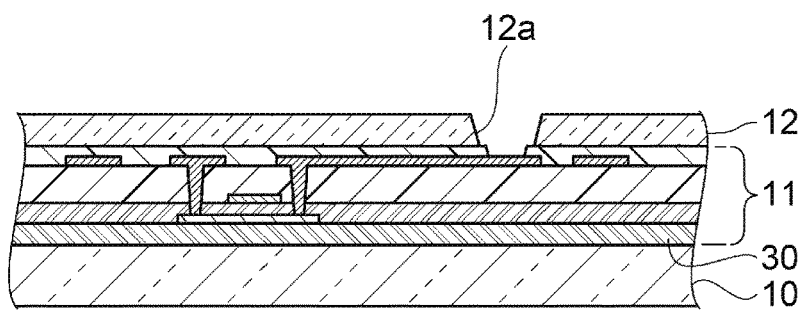
FIG. 12 is a schematic view for explaining the method for manufacturing the electrophoretic display device.

FIG. 12 is a diagram corresponding to the insulating layer disposing step of Step S3. As shown in FIG. 12, in Step S3, the insulating layer 12 is disposed on the second inter-layer insulating film 11r. First, a resin film serving as the material of the insulating layer 12 is disposed. A solution with the acrylic resin dissolved therein is coated on the element layer 11, and then dried and solidified. The resin film can be disposed using an ink jet method and various kinds of printing methods such as offset printing, screen printing, relief printing including flexographic printing, and intaglio printing including gravure printing. In addition, a spin coating method, a roll coating method, a die coating method, a slit coating method, a curtain coating method, a spray coating method, a dip coating method, or the like may be used. Next, the resin film is patterned by a photolithography method and an etching method. With this configuration, the outer shape of the insulating layer 12 and the shape of a through-hole 12a are patterned. Subsequently, the insulating layer 12 is etched using an etchant to form the through-hole 12a.

Figure 13:
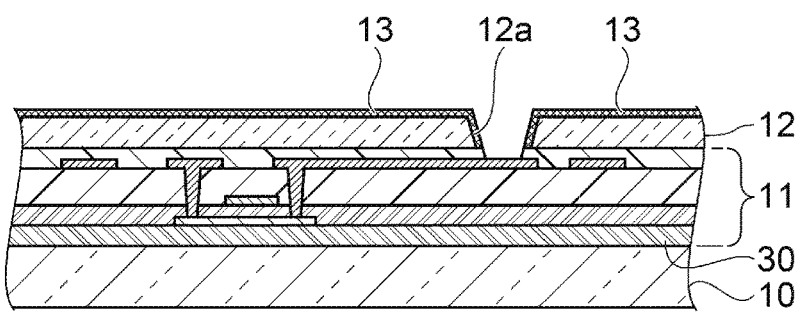
FIG. 13 is a schematic view for explaining the method for manufacturing the electrophoretic display device.
Figure 14:
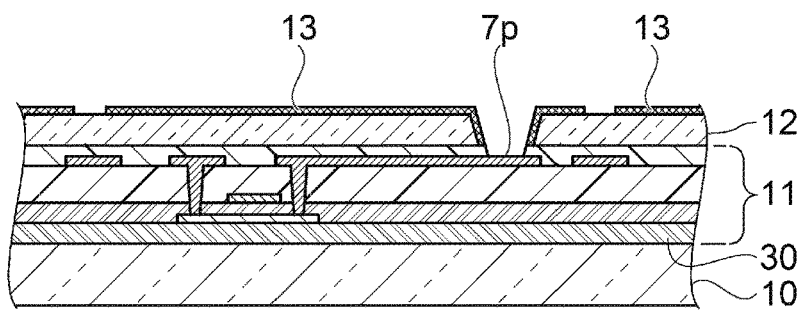
FIG. 14 is a schematic view for explaining the method for manufacturing the electrophoretic display device.

FIGS. 13 and 14 are diagrams corresponding to the protective film disposing step of Step S4. As shown in FIG. 13, in Step S4, a SiN film with a film thickness of approximately 500 nm is formed on the insulating layer 12 and in the through-hole 12a using a deposition method such as vapor deposition or a CVD method. Next, as shown in FIG. 14, the SiN film is patterned and etched to form the protective film 13. In the through-hole 12a, the first drain electrode 7p is exposed. Further, the insulating layer 12 is exposed in a place where the partition wall 5 is disposed. The etching method is not particularly limited, but a dry etching method is used in the embodiment.

Figure 15:
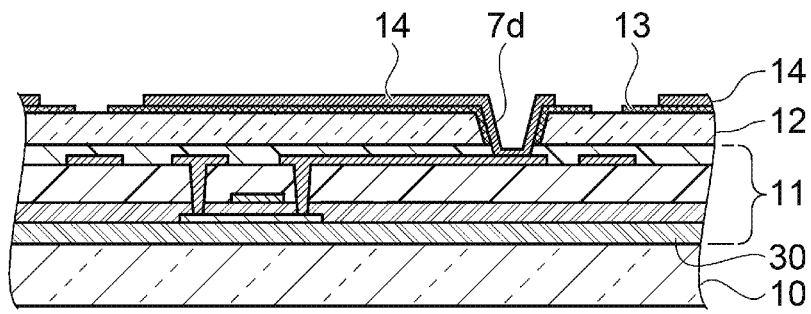
FIG. 15 is a schematic view for explaining the method for manufacturing the electrophoretic display device.

FIG. 15 is a diagram corresponding to the lower electrode disposing step of Step S5. As shown in FIG. 15, in Step S5, an ITO film with a film thickness of approximately 500 nm is formed on the insulating layer 12 and the protective film 13 and in the through-hole 12a using a deposition method such as a sputtering method. Further, the ITO film is etched by a photolithography method and an etching method to form the pixel electrode 14 and the first through-electrode 7d. The insulating layer 12 and the protective film 13 are exposed in the place where the partition wall 5 is to be disposed. The etching method is not particularly limited, but a dry etching method is used in the embodiment.

Figure 16:
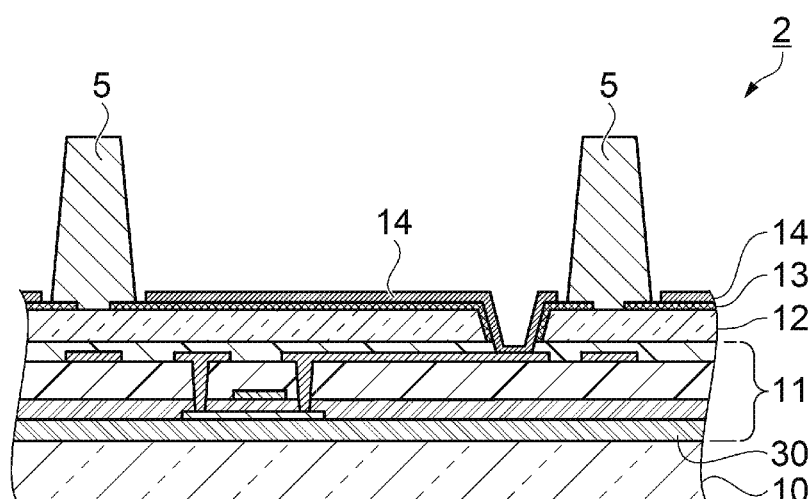
FIG. 16 is a schematic view for explaining the method for manufacturing the electrophoretic display device.

FIG. 16 is a diagram corresponding to the partition wall disposing step of Step S6. As shown in FIG. 16, in Step S6, the partition wall 5 is disposed on the exposed insulating layer 12 and the exposed protective film 13. First, a photosensitive resin material serving as the material of the partition wall 5 is coated on the pixel electrode 14. As the coating method, various kinds of printing methods such as offset printing, screen printing, and relief printing can be used. In addition, a coating method such as a spin coating method or a roll coating method may be used. Subsequently, the photosensitive resin material is heated, dried, and solidified. Next, the photosensitive resin material is patterned by a photolithography method and then etched to shape the partition wall 5. The partition wall 5 of the resin material is disposed to cover the insulating layer 12 in the place where a portion of the protective film 13 is removed. In this step, the first substrate 2 is completed.

Figure 17:
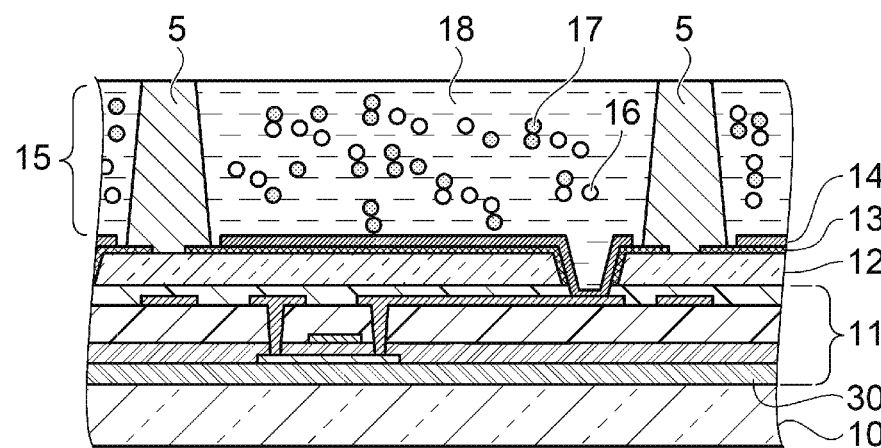
FIG. 17 is a schematic view for explaining the method for manufacturing the electrophoretic display device.

FIG. 17 is a diagram corresponding to the dispersion liquid filling step of Step S7. As shown in FIG. 17, in Step S7, the first substrate 2 with the partition wall 5 disposed thereon is placed in a container (not shown). Then, the white charged particles 16 and the black charged particles 17 are added to the dispersion medium 18 and then stirred to prepare the electrophoretic dispersion liquid 15. Next, the electrophoretic dispersion liquid 15 is supplied to the pixel region 6 using a supply tool such as a syringe. As the method for supplying the electrophoretic dispersion liquid 15, various kinds of printing methods or an ink jet method may be used. The electrophoretic dispersion liquid 15 is supplied to such an extent that the electrophoretic dispersion liquid 15 overflows the pixel region 6.

Figure 18:
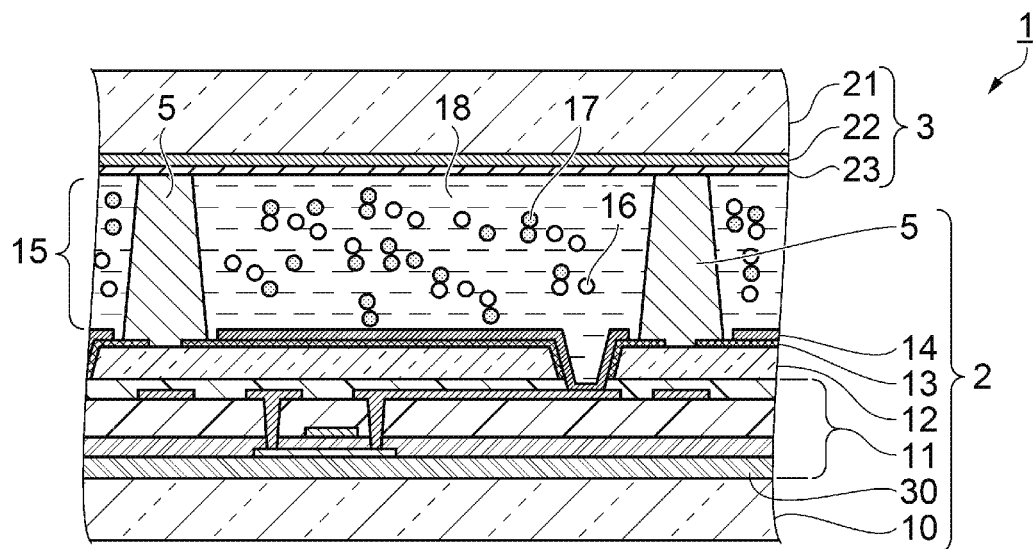
FIG. 18 is a schematic view for explaining the method for manufacturing the electrophoretic display device.

FIG. 18 is a diagram corresponding to the substrate assembling step of Step S8. As shown in FIG. 18, in Step S8, the second substrate 3 is disposed on the partition wall 5. First, the first substrate 2 supplied with the electrophoretic dispersion liquid 15 is placed in a reduced pressure chamber. Next, the second substrate 3 is mounted on the partition wall 5. Subsequently, the pressure in the reduced pressure chamber is reduced to pressurize the second substrate 3 against the first substrate 2. With this state maintained, the sealing layer 23 is irradiated with ultraviolet rays. The sealing layer 23 is ultraviolet-curable and functions also as an adhesive, so that the partition wall 5 and the second substrate 3 are temporarily fixed together. Next, by heating the first substrate 2, on which the second substrate 3 is disposed, to solidify the sealing layer 23, the second substrate 3 is fixed to the partition wall 5. Through the steps described above, the electrophoretic display device 1 is completed.

As described above, the embodiment has the following advantageous effects.

(1) According to the embodiment, the first base material 10 is disposed with the insulating layer 12. The partition wall 5 is disposed on the insulating layer 12. Both the insulating layer 12 and the partition wall 5 are formed of a resin material. Thus, compared with the case where one of the insulating layer 12 and the partition wall 5 is an inorganic material and the other is a resin material, the insulating layer 12 and the partition wall 5 can be fixed together at high strength. Further, the partition wall 5 has a higher hardness than the insulating layer 12, and therefore has high strength. As a result, even when a load is applied to the partition wall 5, it is possible to inhibit the partition wall 5 from collapsing or crushing due to peeling-off from the insulating layer 12.

(2) According to the embodiment, the protective film 13 protecting the insulating layer 12 is disposed on the surface of the insulating layer 12. Thus, the electrophoretic dispersion liquid 15 is prevented from coming in contact with the insulating layer 12. Then, it is possible to prevent the electrophoretic dispersion liquid 15 and the insulating layer 12 from being damaged by each other.

(3) According to the embodiment, a portion of the protective film 13 is located between the partition wall 5 and the insulating layer 12. That is, the partition wall 5 closes the opening of the protective film 13. Thus, the insulating layer 12 is not exposed in the pixel region 6. As a result, it is possible to inhibit the electrophoretic dispersion liquid 15 from coming in contact with the insulating layer 12.

(4) According to the embodiment, the first substrate 2 is disposed with one pixel electrode 14 corresponding to one pixel 8. The partition wall 5 is disposed to surround the pixel electrode 14. In this case, compared with the case where the partition wall 5 surrounds a plurality of pixel electrodes 14, the area of the place surrounded by the partition wall 5 is narrow, and therefore, the strength of the partition wall 5 can be increased. Thus, even when a load is applied to the partition wall 5, it is possible to inhibit the partition wall 5 from collapsing or crushing.

(5) According to the embodiment, the insulating layer 12 and the partition wall 5 are made of a resin material, and the values of the thermal expansion coefficients thereof are close to each other. Thus, even when the temperature changes greatly in the manufacturing steps of the electrophoretic display device 1, the partition wall 5 can be less likely to peel from the insulating layer 12.

(6) According to the embodiment, the force of adhesion between the insulating layer 12 and the partition wall 5 is high. Thus, even when the electrophoretic dispersion liquid 15 expands on heating, it is possible to inhibit the partition wall 5 from peeling from the insulating layer 12.

Second Embodiment

Next, an electrophoretic display device according to a second embodiment will be described using FIG. 19. FIG. is a schematic sectional side elevation showing the structure of the electrophoretic display device. The second embodiment differs from the first embodiment in that the protective film 13 is not located between the insulating layer 12 and the partition wall 5. Parts that are the same as those of the first embodiment are not described.

Figure 19:
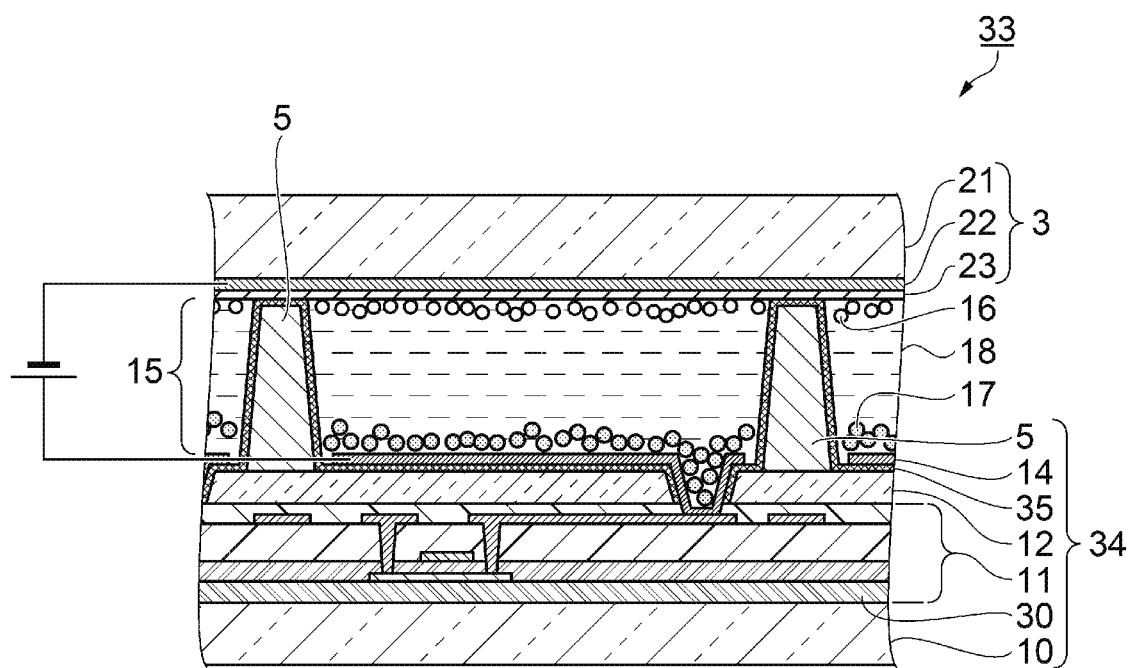
FIG. 19 is a schematic sectional side elevation showing the structure of an electrophoretic display device according to a second embodiment.

That is, in the embodiment as shown in FIG. 19, the electrophoretic display device 33 includes a first substrate 34 and the second substrate 3, and has a structure in which the first substrate 34 and the second substrate 3 interpose the electrophoretic dispersion liquid 15 therebetween. In the first substrate 34, a protective film 35 is disposed on the insulating layer 12, the top of the partition wall 5, and the side surfaces of the partition wall 5. It is sufficient, for the protective film 35 on the side surface of the partition wall 5, to be disposed to such an extent that the insulating layer 12 is not exposed in the boundary between the partition wall 5 and the insulating layer 12, and thus, it is not necessary for the protective film 35 to be disposed on the entire side surface of the partition wall 5. The protective film 35 is not interposed between the insulating layer 12 and the partition wall 5. Thus, the entire bottom surface of the partition wall 5 is in contact with and fixed to the insulating layer 12. Thus, since the contact area of the bottom surface of the partition wall 5 with the insulating layer 12 is wide compared with the first substrate 2 of the first embodiment, the partition wall 5 can be still less likely to peel from the insulating layer 12.

The protective film 35 is formed by a CVD method or the like after the partition wall 5 is disposed on the insulating layer 12. Thereafter, the first drain electrode 7p in the contact hole is exposed, and then, the pixel electrode 14 is formed. In FIG. 19, the protective film 35 is also disposed on the top of the partition wall 5; however, the protective film 35 on the top of the partition wall 5 may be removed.

Third Embodiment

Figure 20:
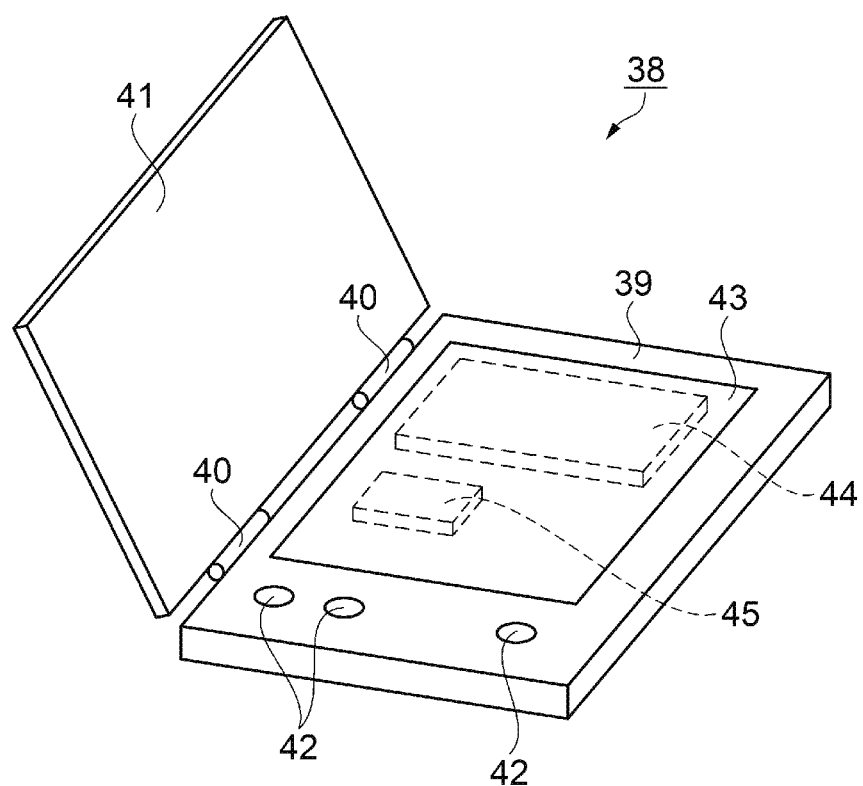
FIG. 20 is a schematic perspective view showing the structure of an electronic book according to a third embodiment.
Figure 21:
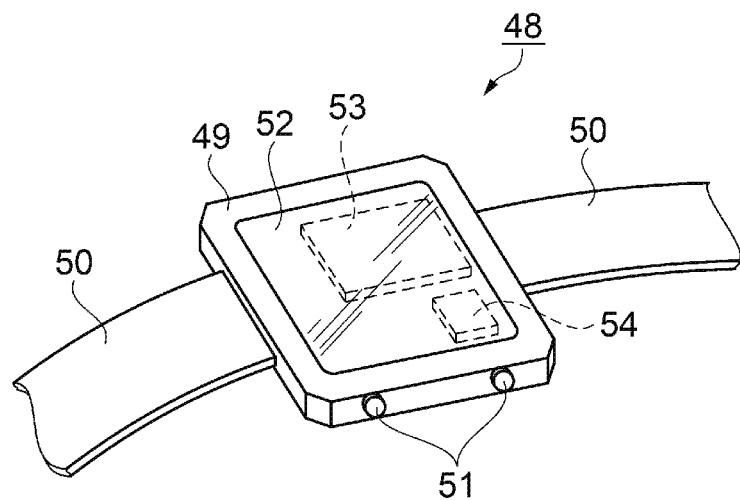
FIG. 21 is a schematic perspective view showing the structure of a wristwatch.

Next, an electronic apparatus including the electrophoretic display device mounted therein according to a third embodiment will be described using FIGS. 20 and 21. FIG. 20 is a schematic perspective view showing the structure of an electronic book. FIG. 21 is a schematic perspective view showing the structure of a wristwatch. As shown in FIG. 20, the electronic book 38 as the electronic apparatus includes a plate-like case 39. The case 39 is disposed with a lid portion 41 through hinges 40. Further, the case 39 is disposed with operation buttons 42 and a display unit 43 as a display device. An operator can operate the contents to be displayed on the display unit 43 by operating the operation buttons 42.

Inside the case 39, a control unit 44 and a signal drive unit 45 that drives a data signal to the display unit 43 are disposed. The control unit 44 outputs display data to the signal drive unit 45, and also outputs a timing signal when converting the display data into the data signal. The signal drive unit 45 generates the data signal from the display data, and outputs the data signal to the display unit 43. Moreover, the control unit 44 outputs a display control signal that is synchronized with the data signal output by the signal drive unit 45 to the display unit 43. The display unit 43 generates a signal necessary for electrophoretic display, from the display control signal and data signal input thereto, in a signal distributing circuit inside the display unit 43, so that it is possible to perform display according to the display data output by the control unit 44 to the display unit 43. The operation of the operator through the operation buttons 42 is converted into a signal at the appropriate time, and the signal is transmitted to the control unit 44 and reflected in the output signal of the control unit 44. As the display unit 43, any of the electrophoretic display device 1 and the electrophoretic display device 33 is used. Thus, the electronic book 38 can be a device using, as the display unit 43, the electrophoretic display device in which the partition wall 5 is less likely to collapse and thus which has an easy-to-assemble structure.

As shown in FIG. 21, the wristwatch 48 as the electronic apparatus includes a plate-like case 49. The case 49 includes a band 50, and the operator can wrap the band 50 around the arm to secure the wristwatch 48 to the arm. Further, the case 49 is disposed with operation buttons 51 and a display unit 52 as a display device. The operator can operate the contents to be displayed on the display unit 52 by operating the operation buttons 51.

Inside the case 49, a control unit 53 that controls the wristwatch 48 and a signal drive unit 54 that drives a signal to the display unit 52 are disposed. The control unit 53 outputs display data and a necessary timing signal to the signal drive unit 54. The necessary timing signal may include a signal directly output from the control unit 53 to the display unit 52. The signal drive unit 54 outputs the signal necessary for display to the display unit 52, so that the contents corresponding to the display data can be displayed on the display unit 52. As the display unit 52, any of the electrophoretic display device 1 and the electrophoretic display device 33 is used. Thus, the wristwatch 48 can be a device using, as the display unit 52, the electrophoretic display device in which the partition wall 5 is less likely to collapse and thus which has an easy-to-assemble structure.

The invention is not limited to the embodiments described above, and various modifications or improvements can be added within the technical idea of the invention by a person ordinarily skilled in the art. Modified examples will be described below.

Modified Example 1

In the first embodiment, the white charged particles 16 and the black charged particles 17 are disposed in the electrophoretic dispersion liquid 15. Instead of the white charged particles 16 and the black charged particles 17, charged particles of red, green, blue, and other colors may be used. According to this configuration, color display can be performed by displaying the red, green, blue, and other colors. In addition, only charged particles of one color may be used in the electrophoretic dispersion liquid 15.

Modified Example 2

In the first embodiment, one pixel electrode 14 is disposed in one pixel region 6. A plurality of pixel electrodes 14 may be disposed in one pixel region 6. Display can be subdivided.

Modified Example 3

In the first embodiment, the white charged particles 16 are positively charged, while the black charged particles 17 are negatively charged. The white charged particles 16 may be negatively charged, while the black charged particles 17 may be positively charged. An easy-to-control charged state may be employed.

Modified Example 4

In the first embodiment, the shape of the pixel region 6 is quadrilateral. The shape of the pixel region 6 may be a circle, an ellipse, a polygon, or a shape including an arc and a line. In this case, since the partition wall 5 is formed of a resin material, the shape of the partition wall 5 can be easily matched to the shape of the pixel region 6.

Modified Example 5

In the first embodiment, after the electrophoretic dispersion liquid 15 is disposed in the pixel regions 6 of the first substrate 2, the first substrate 2 and the second substrate 3 are joined together. In addition, after the pixel regions 6 are communicated with each other and the first substrate 2 and the second substrate 3 are joined together, the electrophoretic dispersion liquid 15 may be disposed in the pixel regions 6. An easy-to-manufacture step order may be employed.

Modified Example 6

In the first embodiment, the first semiconductor element 7 is disposed in the first substrate 2. A structure may be employed in which the first semiconductor element 7 is not disposed in the first substrate 2 but only the pixel electrode 14 is disposed therein. Then, a drive circuit that directly applies a voltage to the pixel electrode 14 may be provided. Since the structure of the first substrate 2 is simplified, the first substrate 2 can be easily manufactured.

The entire disclosure of Japanese Patent Application No. 2015-184810, filed Sep. 18, 2015 is expressly incorporated by reference herein.

The invention claimed is:

1. A display device substrate comprising:
   a substrate including an insulating layer;
   a partition wall disposed on the insulating layer;
   a protective film that protects the insulating layer, the protective film being disposed on a surface of the insulating layer, the protective film including an opening, the width of the opening being narrower than the width of the bottom portion of the partition wall;
   wherein the partition wall is disposed so as to close the opening,
   the insulating layer and the partition wall are formed of a resin material, and
   the partition wall has a higher hardness than the insulating layer.

2. The display device substrate according to claim 1, wherein
   the substrate includes one pixel electrode corresponding to one pixel, and the partition wall is disposed to surround the pixel electrode.

3. The display device substrate according to claim 2, wherein the pixel electrode is disposed on the protective film and electrically connected to a drain electrode of a thin film transistor (TFT).

4. The display device substrate according to claim 3, wherein the pixel electrode is electrically connected to the drain electrode via a through-electrode.

5. The display device substrate according to claim 1, wherein the insulating layer is a planarizing layer.

6. A display device comprising:
   the display device substrate according to claim 1;
   a transparent sealing member supported by the partition wall;
   a counter electrode disposed on the transparent sealing member;
   a circuit portion located between the substrate and the insulating layer and connected to a pixel electrode; and
   an electrophoretic dispersion liquid sealed in a space formed by the partition wall, the transparent sealing member, and the substrate.

7. An electronic apparatus comprising:
   the display device according to claim 6; and
   a control unit that controls the display device.

8. The display device substrate of claim 1, wherein the partition wall comprises a crosslinked resin.

* * * * *